(12) United States Patent
Hangebrauck

(10) Patent No.: US 8,913,868 B2
(45) Date of Patent: Dec. 16, 2014

(54) FIBER OPTIC COMPONENT TRAY

(75) Inventor: Daniel B. Hangebrauck, Garner, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 121 days.

(21) Appl. No.: 13/432,621

(22) Filed: Mar. 28, 2012

(65) Prior Publication Data

US 2012/0269487 A1 Oct. 25, 2012

Related U.S. Application Data

(60) Provisional application No. 61/468,438, filed on Mar. 28, 2011.

(51) Int. Cl.
*G02B 6/00* (2006.01)
*G02B 6/46* (2006.01)
*G02B 6/44* (2006.01)

(52) U.S. Cl.
CPC .................................. *G02B 6/4454* (2013.01)
USPC .......................................... 385/135; 385/137

(58) Field of Classification Search
None
See application file for complete search history.

(56) References Cited

U.S. PATENT DOCUMENTS

| 5,323,480 | A | 6/1994 | Mullaney et al. |
| 5,446,823 | A | 8/1995 | Bingham et al. |
| 6,240,236 | B1 * | 5/2001 | Daoud ........................ 385/137 |
| 6,249,635 | B1 | 6/2001 | Daoud |
| 6,249,636 | B1 * | 6/2001 | Daoud ........................ 385/137 |
| 6,259,851 | B1 | 7/2001 | Daoud |
| 6,285,815 | B1 | 9/2001 | Daoud |
| 6,311,007 | B1 | 10/2001 | Daoud |
| 6,370,309 | B1 | 4/2002 | Daoud |
| 6,424,782 | B1 | 7/2002 | Ray |
| 6,456,772 | B1 | 9/2002 | Daoud |
| 6,504,987 | B1 | 1/2003 | Macken et al. |
| 6,507,691 | B1 | 1/2003 | Hunsinger et al. |
| 6,567,601 | B2 | 5/2003 | Daoud et al. |
| 6,801,704 | B1 | 10/2004 | Daoud et al. |
| 7,072,559 | B2 | 7/2006 | Giordano et al. |
| 7,142,764 | B2 | 11/2006 | Allen et al. |
| 7,272,291 | B2 | 9/2007 | Bayazit et al. |
| 7,298,952 | B2 | 11/2007 | Allen et al. |
| 7,340,145 | B2 | 3/2008 | Allen |
| 7,356,237 | B2 | 4/2008 | Mullaney et al. |
| 7,359,613 | B2 | 4/2008 | Mullaney et al. |
| 7,393,148 | B2 | 7/2008 | Allen et al. |

(Continued)

FOREIGN PATENT DOCUMENTS

JP          11122757 A    *   4/1999

*Primary Examiner* — Michelle R Connelly
(74) *Attorney, Agent, or Firm* — Merchant & Gould P.C.

(57) ABSTRACT

The present disclosure relates to a structure for holding an optical component on a fiber management tray. The structure includes a plurality of substantially parallel retaining members that cooperate to define elongated pockets for receiving optical components. The elongated pockets are defined between the retaining members. The retaining members have lengths that extend along lengths of the pockets, and have cantilevered configurations with fixed base ends. The retaining members also have heights that project upwardly from the base ends to free ends, and are configured to flex to allow optical components to be inserted into the pockets. Each of the retaining members includes a concave side that faces downwardly and a convex side that faces upwardly. Each of the pockets has a first side defined by the concave side of one retaining member and a second side defined by the convex side of an adjacent retaining member.

7 Claims, 16 Drawing Sheets

(56) References Cited

U.S. PATENT DOCUMENTS

| | | |
|---|---|---|
| 7,406,242 B1 | 7/2008 | Braga |
| 7,428,366 B2 | 9/2008 | Mullaney et al. |
| 7,454,115 B2 | 11/2008 | Allen |
| 7,684,669 B2 * | 3/2010 | Bayazit et al. ............... 385/135 |
| 7,738,761 B2 | 6/2010 | Mullaney et al. |
| 7,780,173 B2 | 8/2010 | Mullaney et al. |
| 7,860,364 B2 | 12/2010 | Mullaney et al. |
| 2002/0159744 A1 * | 10/2002 | Daoud ......................... 385/135 |
| 2004/0042755 A1 | 3/2004 | Vincent et al. |
| 2006/0193586 A1 | 8/2006 | Hoehne et al. |
| 2006/0215980 A1 | 9/2006 | Bayazit et al. |
| 2009/0148117 A1 | 6/2009 | Laurisch |
| 2009/0290842 A1 | 11/2009 | Bran de Leon et al. |
| 2010/0183274 A1 | 7/2010 | Brunet et al. |
| 2010/0284661 A1 | 11/2010 | Bran de Leon et al. |

\* cited by examiner

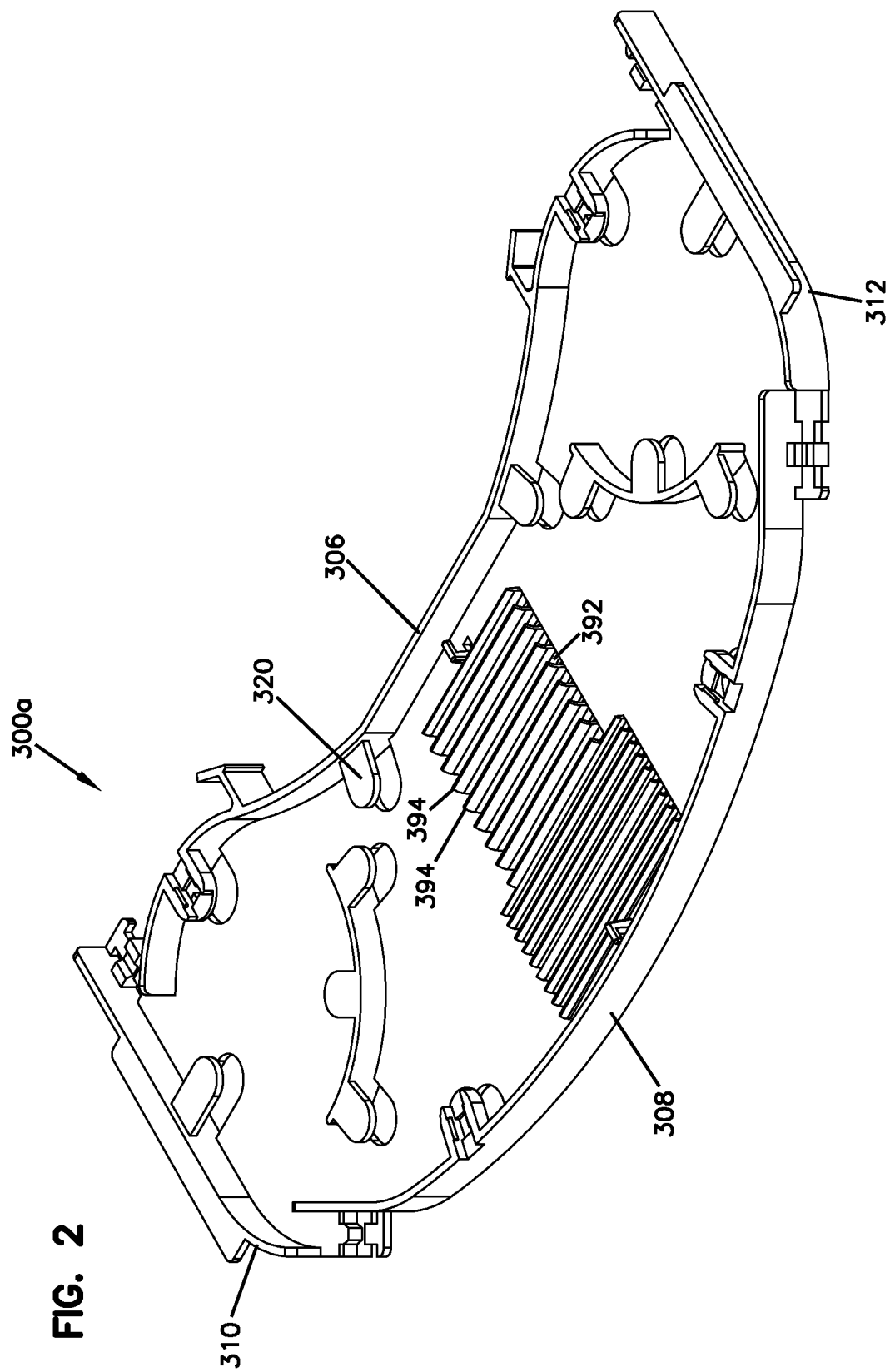

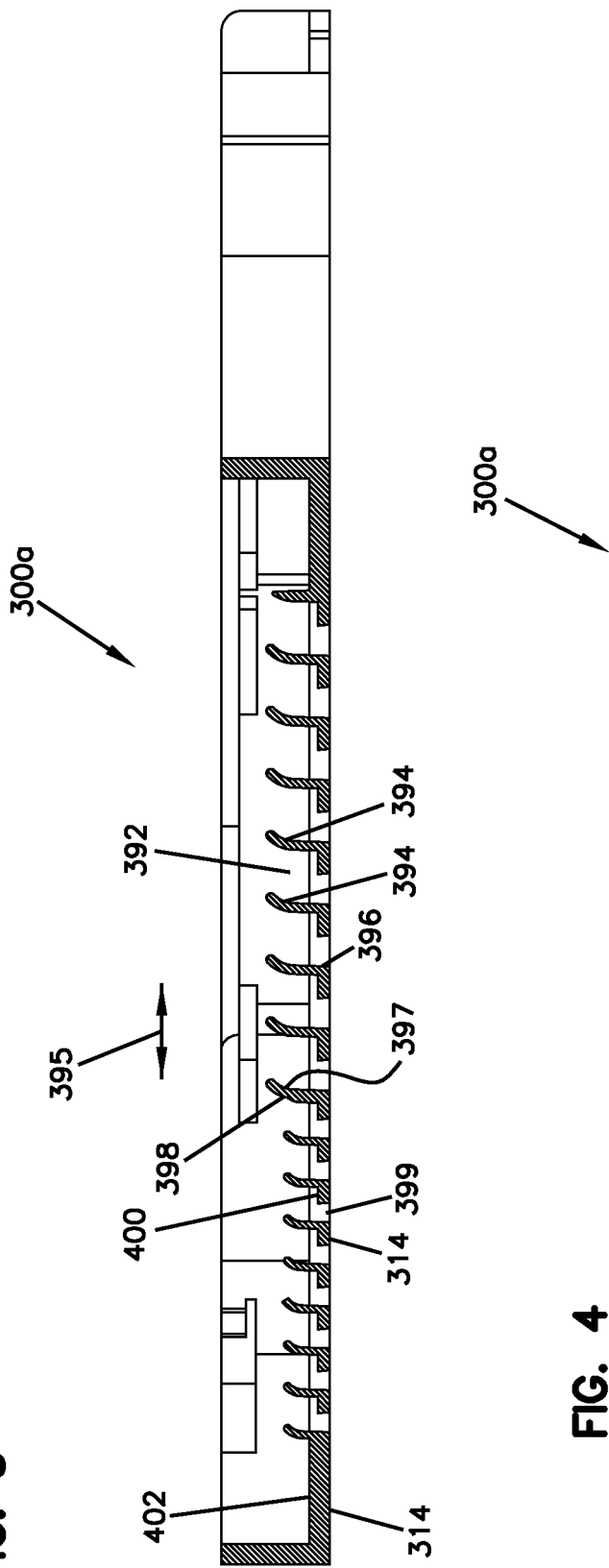
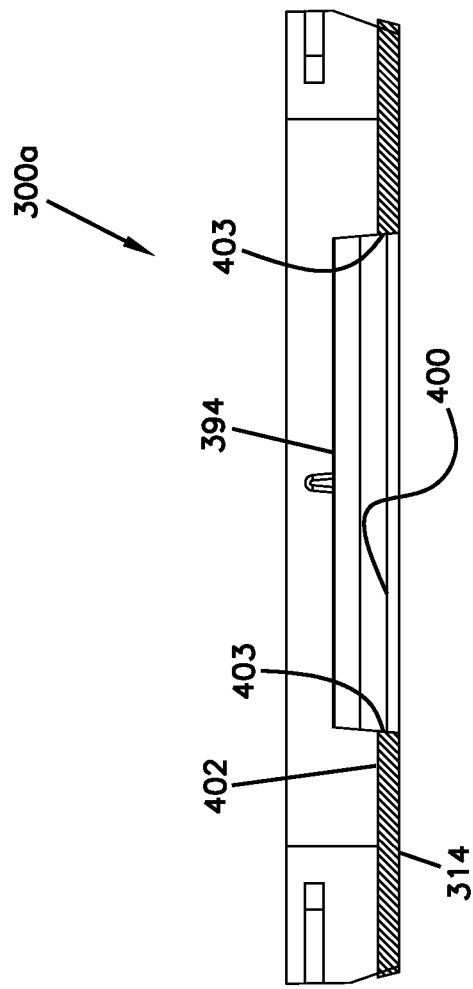

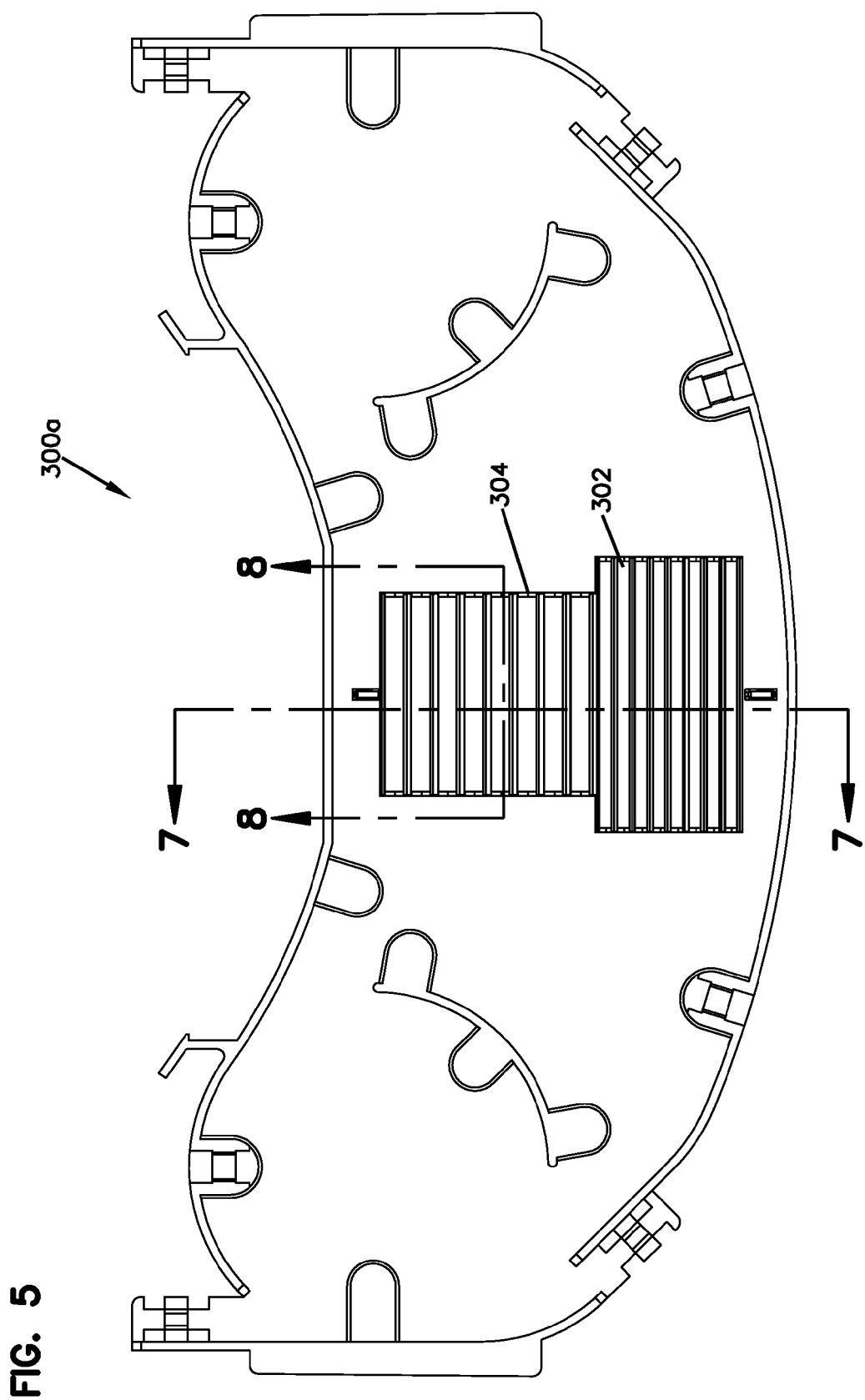

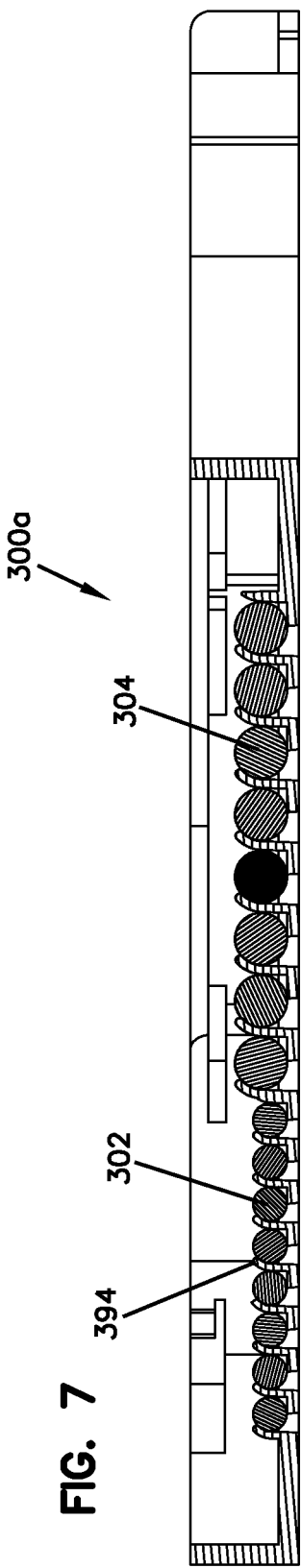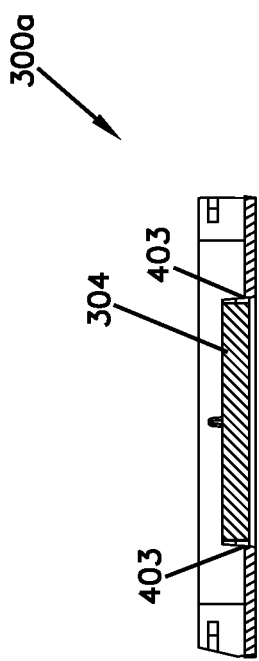

FIBER OPTIC COMPONENT TRAY

CROSS-REFERENCE TO RELATED APPLICATION

The present application claims the benefit of U.S. Provisional Patent Application Ser. No. 61/468,438, filed Mar. 28, 2011, which application is hereby incorporated by reference in its entirety.

TECHNICAL FIELD

The present disclosure relates generally to equipment for fiber optic communications networks. More particularly, the present disclosure relates to optical fiber management trays/cassettes used in fiber optic networks.

BACKGROUND

Fiber optic communication systems are becoming prevalent in part because service providers want to deliver high band width communication capabilities to customers. Fiber optic communication systems employ a network of fiber optic cables to transmit large volumes of data and voice signals over relatively long distances. A typical fiber optic network includes a system of trunk fiber optic cables each including a relatively large number of optical fibers. Fiber optic networks also include drop cables that interconnect to fibers of the trunk cables at various locations along the lengths of the trunk cables. The drop cables can be routed from the trunk cables to subscriber locations or to intermediate structures such as drop terminals.

Drop cables are often connected to the optical fibers of trunk cables via splices (e.g., fusion splices). Splices are typically supported within splice trays that are often protected from the environment by sealed, re-enterable closures. Such closures typically include sealed ports through which the trunk cables and drop cables enter the closures. Example dome-style splice closures are disclosed in U.S. Pat. Nos. 7,780,173; 5,446,823; and 5,323,480; which patents are hereby incorporated by reference in their entireties.

Splice trays are used to protect splices (e.g., fusion splices) and to manage the optical fibers routed to and from the splice locations. Splice trays are used throughout the network. For example, splice trays can be found in central office racks and cabinets, splice closures, fiber distribution hubs, pedestals, drop terminals, and elsewhere within a given communication network. Example splice tray configurations are disclosed at U.S. Patent Publication No. 2009/0290842; U.S. Pat. No. 7,272,291; U.S. Pat. No. 6,801,704; U.S. Pat. No. 6,567,601; U.S. Pat. No. 6,456,772; U.S. Pat. No. 6,370,309; U.S. Pat. No. 6,311,007; U.S. Pat. No. 6,285,815; U.S. Pat. No. 6,259,851; U.S. Pat. No. 6,249,636; and U.S. Pat. No. 6,249,635.

SUMMARY

Certain aspects of the present disclosure relate to compact and cost effective arrangements for holding optical components such as splice sleeves, power splitters and wavelength division splitters on a fiber management tray or cassette.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosure herein are based.

BRIEF DESCRIPTION OF THE DRAWINGS

FIG. 2 is a perspective view of the component tray of FIG. 1;

FIG. 3 is a cross-sectional view taken along section line 3-3 of FIG. 1;

FIG. 4 is a cross-sectional view taken along section line 4-4 of FIG. 1;

FIG. 5 is a plan view of the component tray of FIG. 1 with wavelength splitting components and splicing components secured thereto;

FIG. 7 is a cross-sectional view taken along section line 7-7 of FIG. 5;

FIG. 8 is a cross-sectional view taken along section line 8-8 of FIG. 5;

DETAILED DESCRIPTION

The present disclosure relates generally to fiber management trays/cassettes used for protecting optical components and for managing optical fibers routed to and from the components. Example components include splice sleeves, signal power splitters and wavelength division multiplexers/splitters. Optical power splitters are capable of splitting an entire optical signal carried by one optical fiber to two or more optical fibers (e.g., 1 by 2 splitters; 1 by 4 splitters; 1 by 8 splitters, 1 by 16 splitters; 1 by 32 splitters, etc.), and are also capable of combining optical signals from multiple fibers back to one optical fiber. Wavelength splitting/dividing structures (e.g., coarse wavelength dividing multiplexers and de-multiplexers, dense wavelength dividing multiplexers and de-multiplexers, array waveguide grading structures, etc.) are capable dividing an optical signal carried by one optical fiber into separate wavelength ranges with each range then being directed to and carried by a separate optical fiber, and are also capable of combining separate wavelength ranges carried by separate optical fibers back to one optical fiber. Splice sleeves are structures for reinforcing a slice (e.g., a fusion splice) between two optical fibers. A splice sleeve typically includes an inner adhesive layer surrounded by a heat shrink layer. Splice sleeves also typically include axial reinforcing members attached to the heat shrink layer.

FIGS. 1-8 show a component tray 300a (i.e., a cassette) in accordance with the principles of the present disclosure. The component tray 300a is configured to securely retain optical components such as splice sleeves 302 and wavelength splitting components 304 in a compact configuration. As shown at FIGS. 5-8, the splice sleeves 302 and the components 304 are generally cylindrical. The components 304 have larger diameters as compared to the splice sleeves 302.

Figure 1:
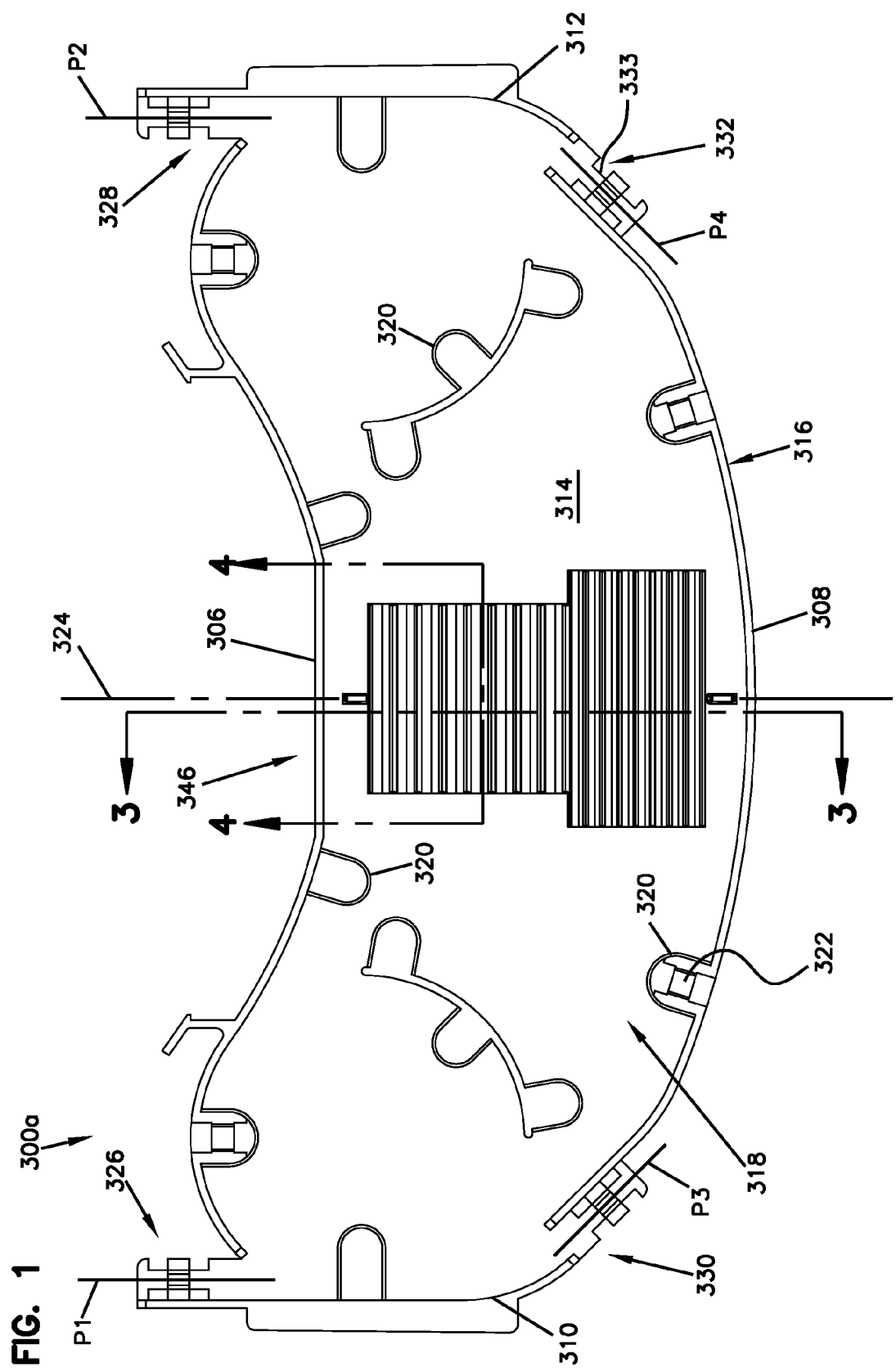
FIG. 1 is a plan view of a first component tray in accordance with the principles of the present disclosure.
Figure 6:
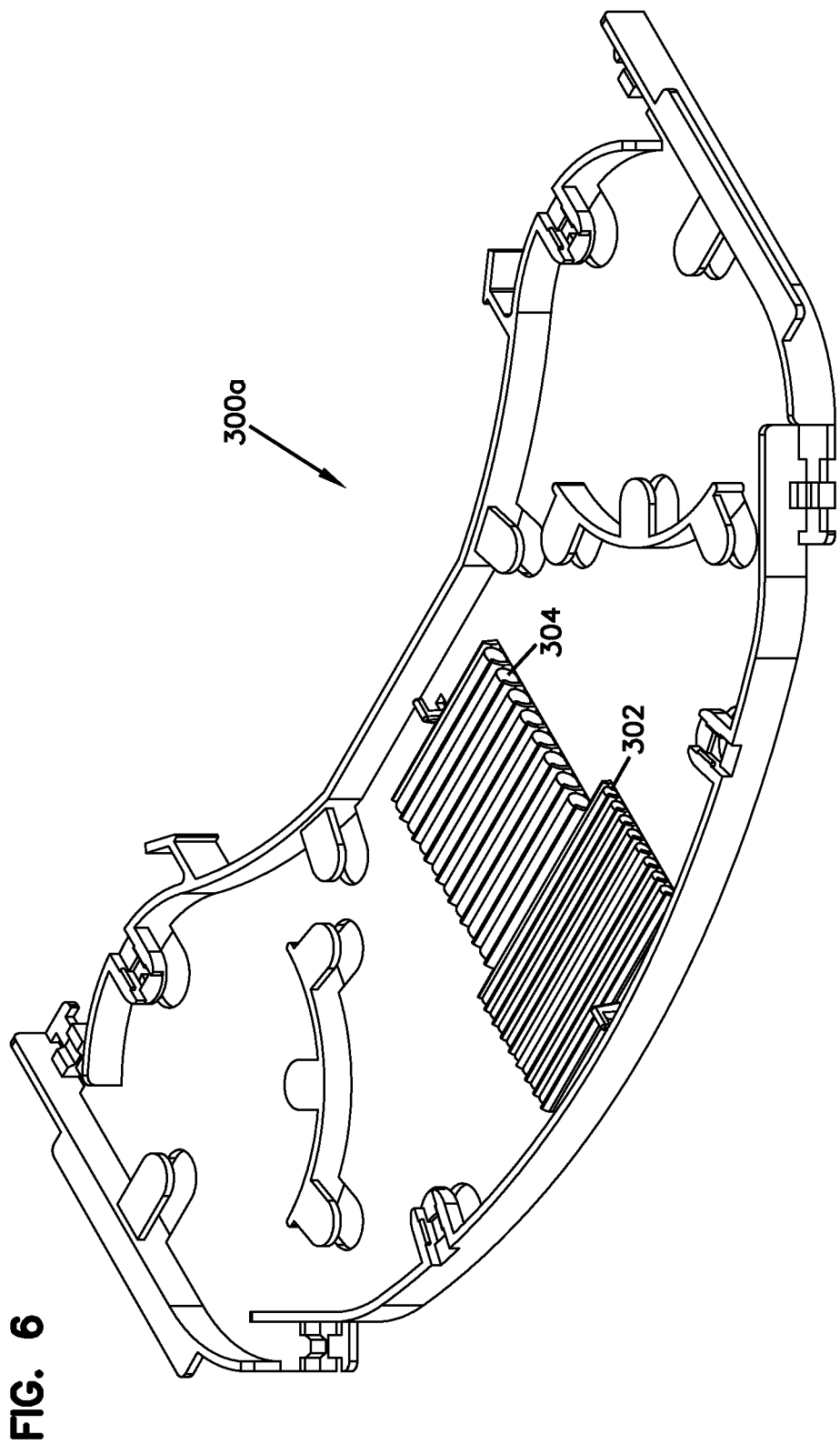
FIG. 6 is a perspective view of the component tray of FIG. 1 with wavelength splitting components and splicing components secured thereto.
Figure 9:
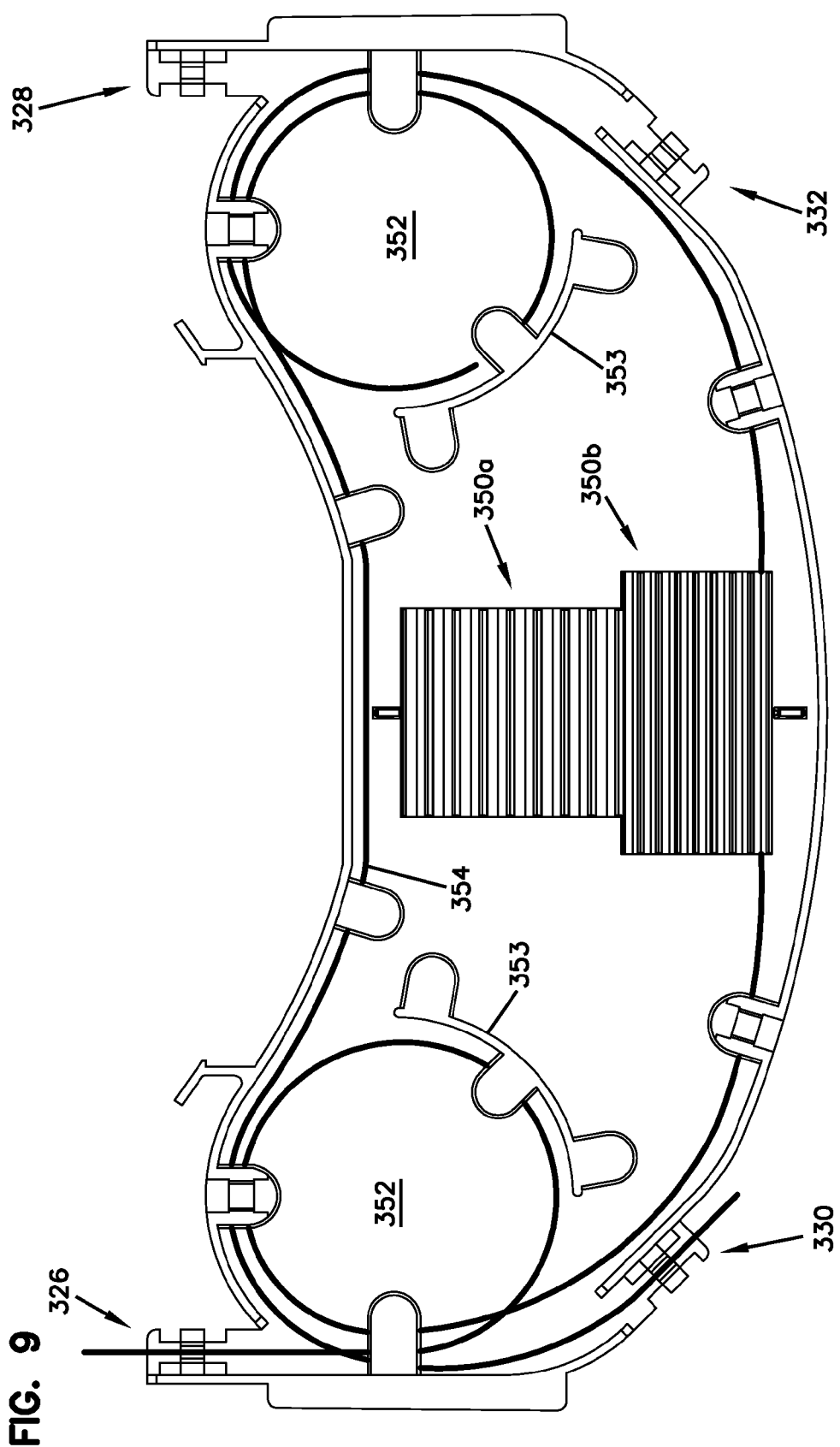
FIG. 9 shows a first fiber routing path of the component tray of FIG. 1.
Figure 10:
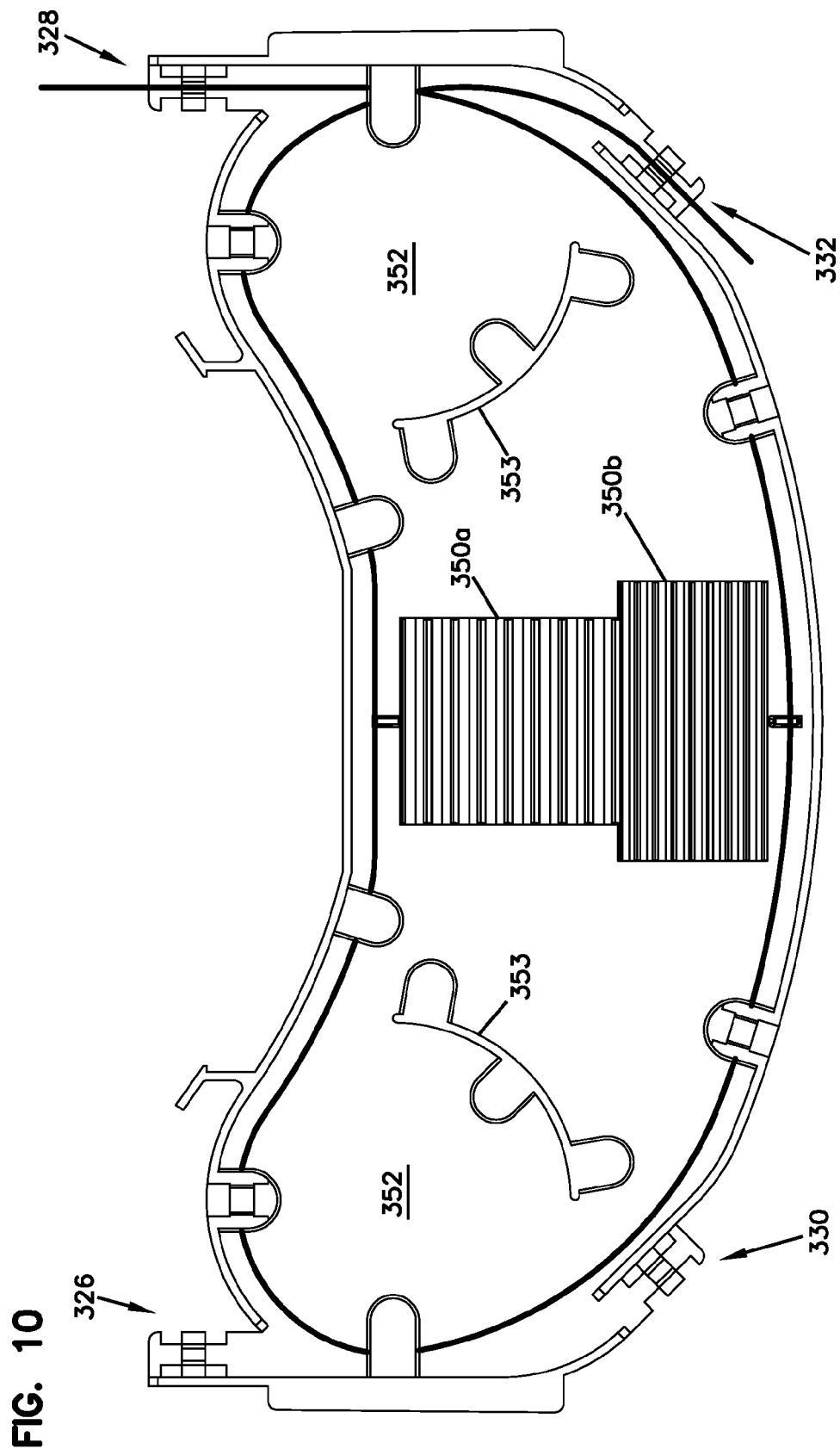
FIG. 10 shows a second fiber routing path of the component tray of FIG. 1.
Figure 11:
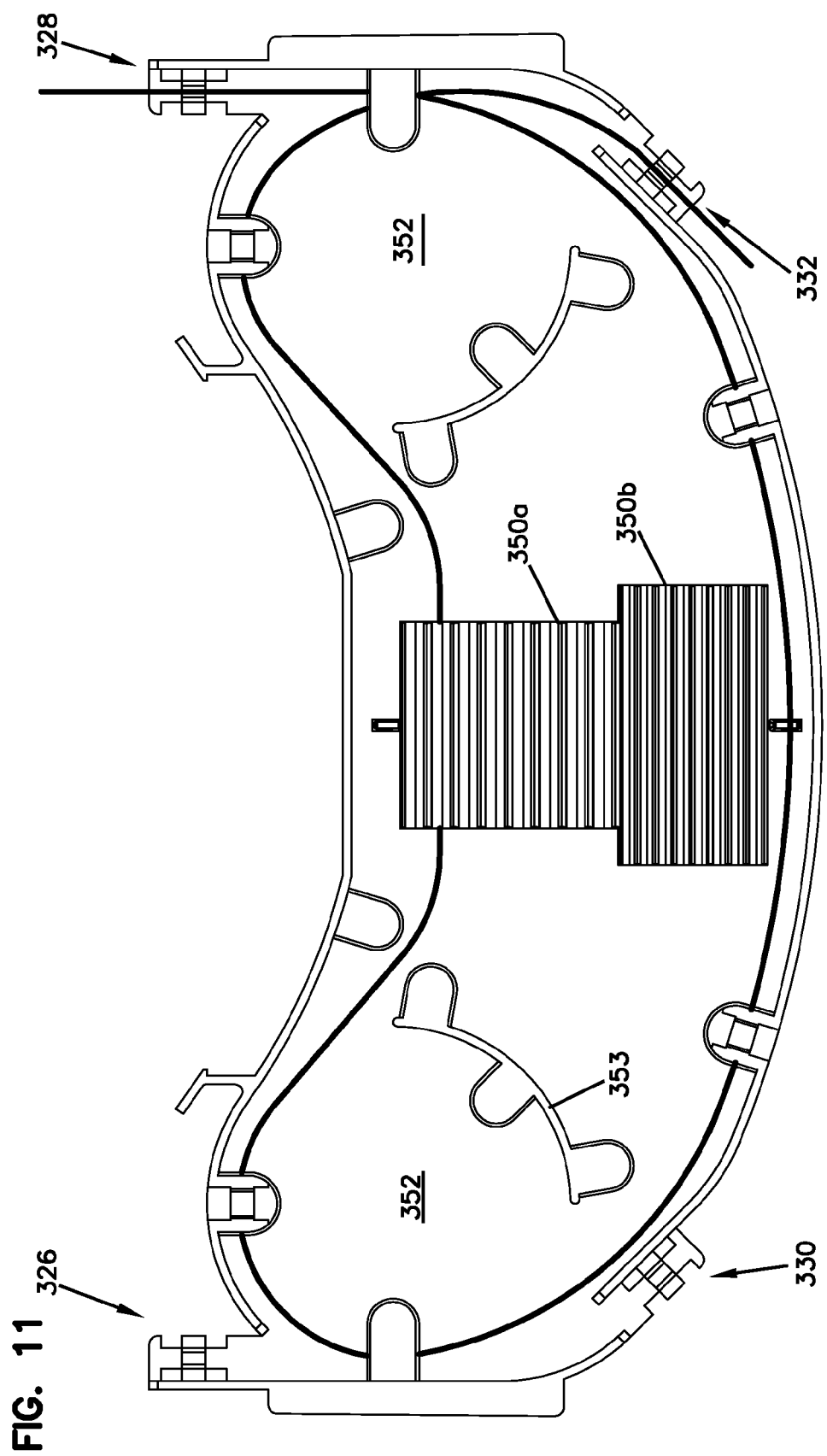
FIG. 11 shows a third fiber routing path of the component tray of FIG. 1.
Figure 12:
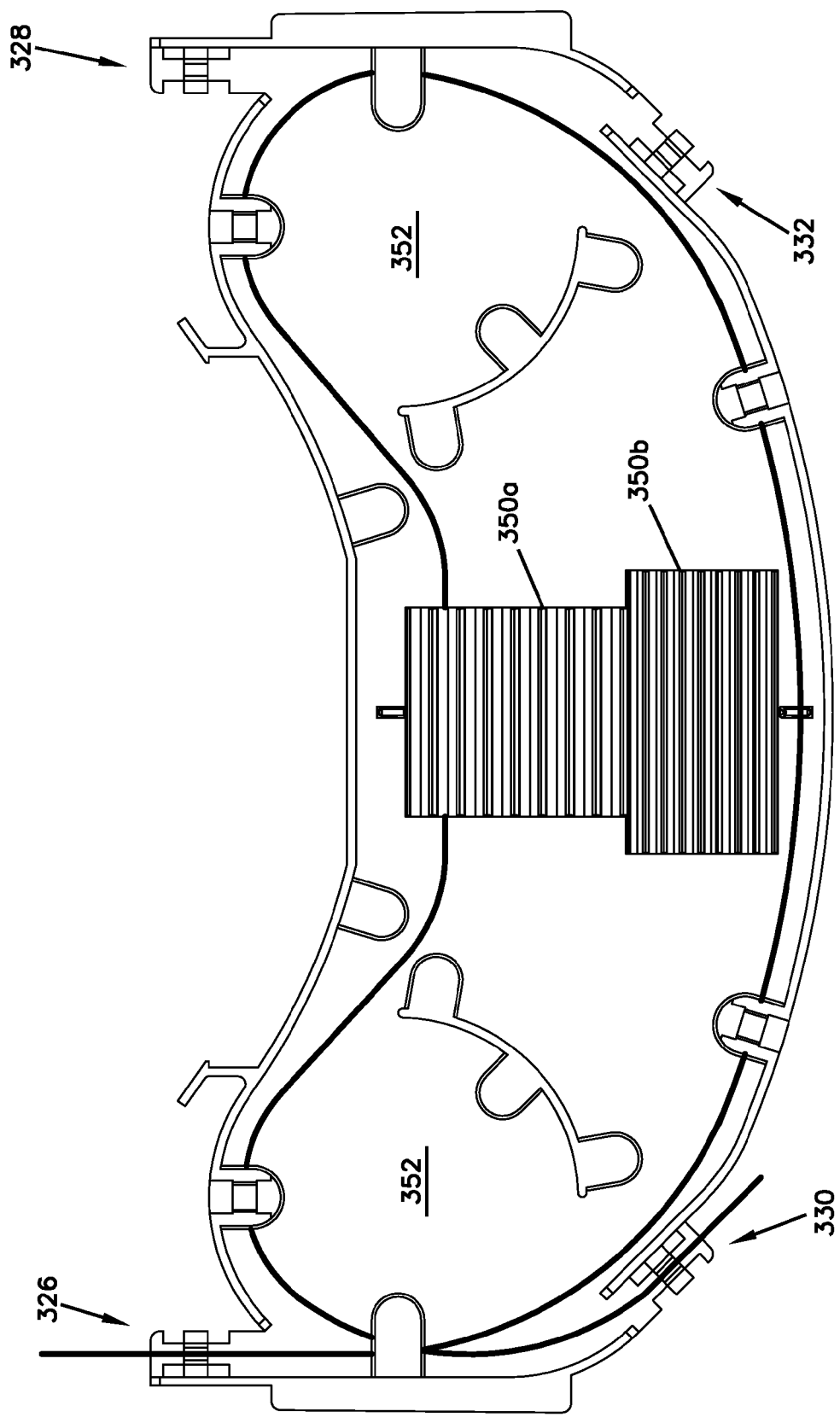
FIG. 12 shows a fourth fiber routing path of the component tray of FIG. 1.
Figure 13:
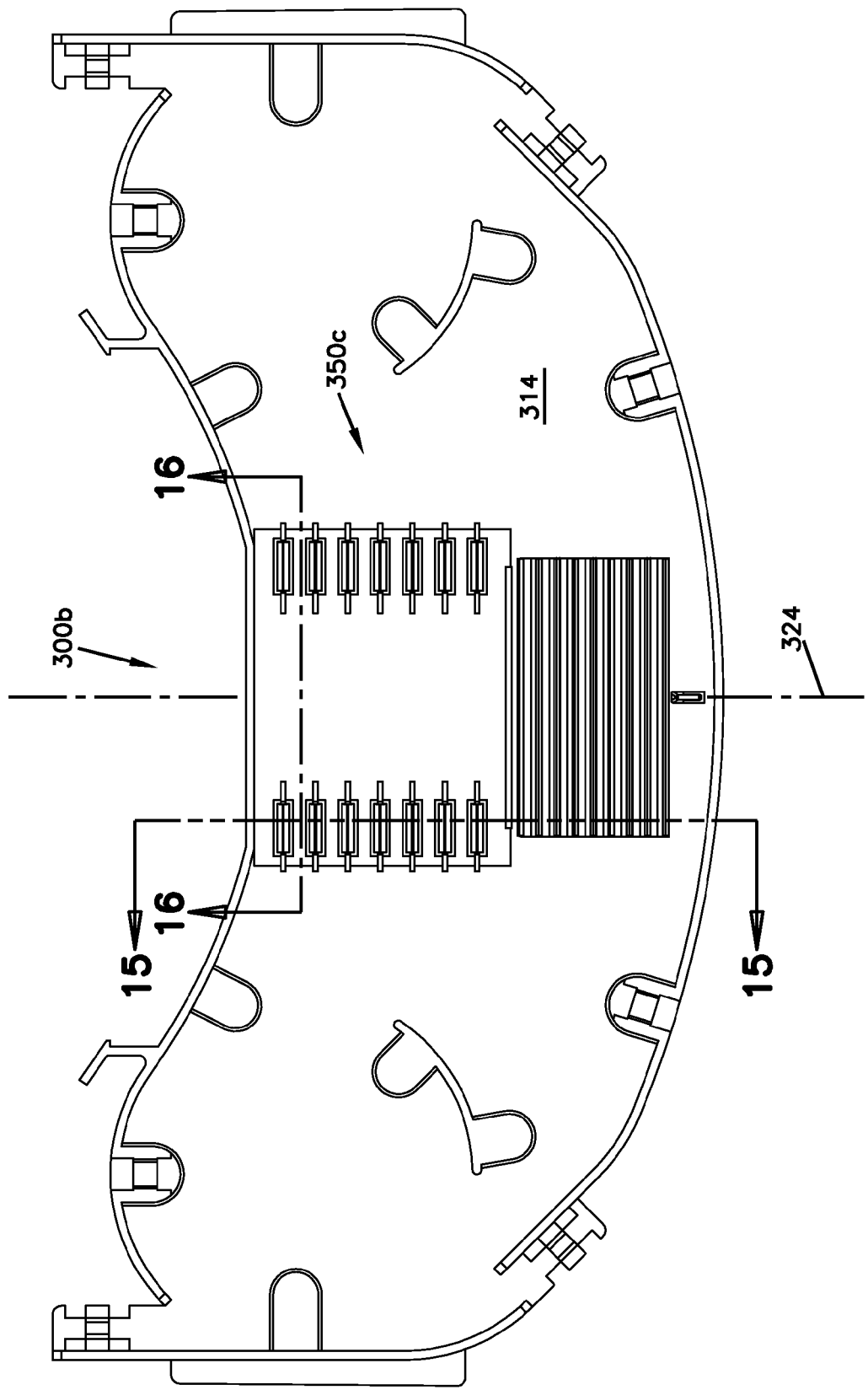
FIG. 13 is a plan view of a second component tray in accordance with the principles of the present disclosure.
Figure 14:
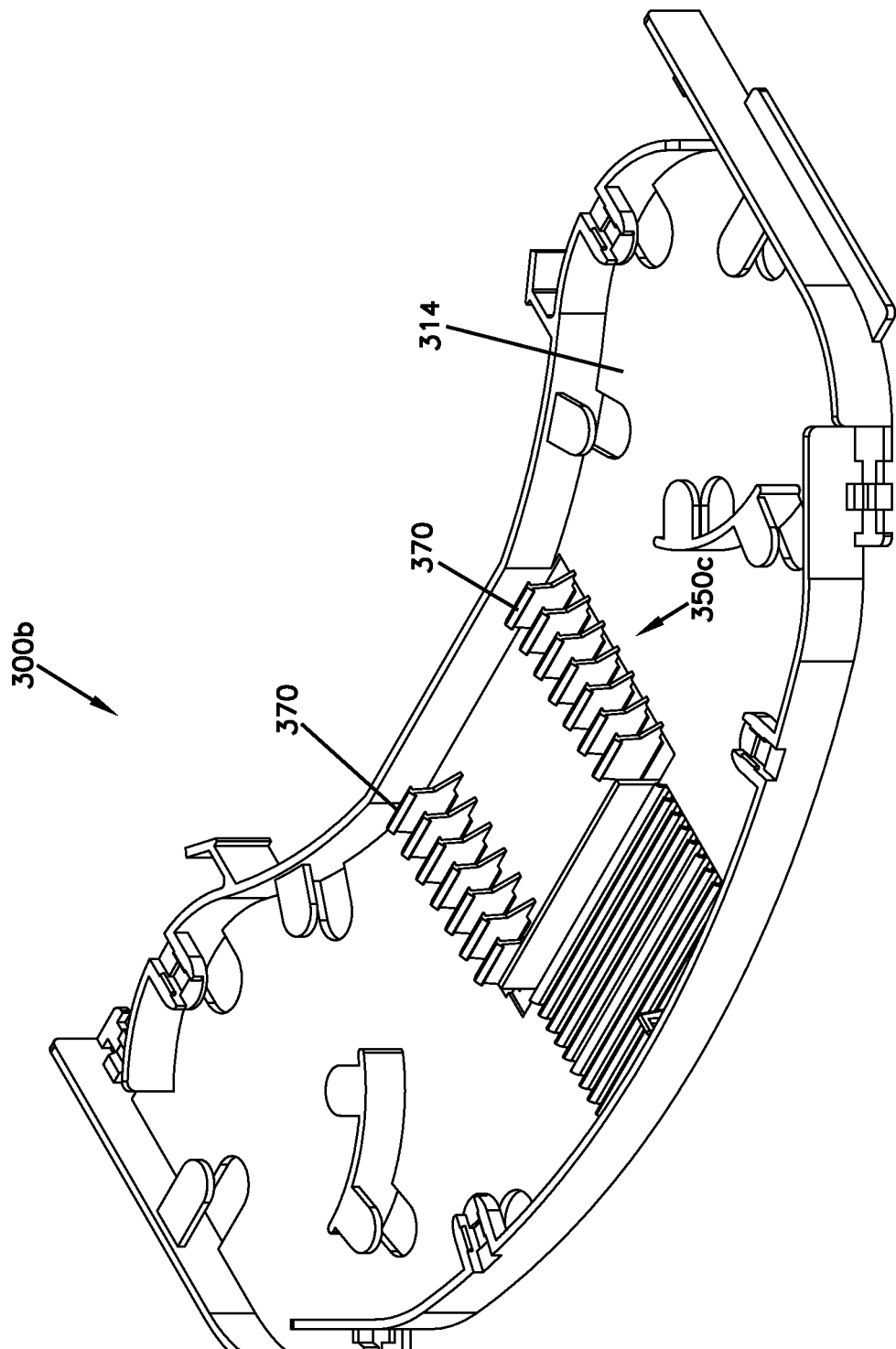
FIG. 14 is a perspective view of the component tray of FIG. 13.

Referring to FIG. 1, the component tray 300a has a generally kidney-shaped perimeter when viewed in plan view. The perimeter is defined in part by a concave side 306 of the tray 300a and an opposite convex outer side 308 of the tray 300a. The perimeter is also defined by opposite ends 310, 312 of the tray 300a that extend between the concave and convex sides 306, 308. The ends 310, 312 are substantially parallel to one another. The tray 300a includes a base 314 and a perimeter wall arrangement 316 that projects upwardly from the base 314. The perimeter wall arrangement 316 extends around the perimeter of the tray 300a and cooperates with the base 314 to define a protected fiber management volume/space 318 above the base 314. Fiber retention tabs 320 project inwardly from the perimeter wall arrangement 316. The tabs 320 are spaced above the base 314 and overhang the fiber management space 318. The tabs 320 function to retain optical fibers routed on the tray 300a within the fiber management space 318. Some of the tabs 320 include receptacles 322 for receiving fasteners (e.g., in a snap-fit arrangement) used to secure a cover over the top of the space 318.

Referring still to FIG. 1, the tray 300a is symmetric about a central axis 324. The tray 300a includes two fiber entrance/exit locations 326, 328 positioned at the concave side 306 of the tray and two fiber entrance/exit locations 330, 332 positioned at the convex side 308 of the tray. The locations 326, 330 are at one end 310 of the tray and the locations 328, 332 are located at the other end 312 of the tray. The locations 326, 328 define fiber routing paths P1, P2 that are substantially parallel to the central axis 324, while the locations 330, 332 define fiber routing paths P3, P4 that converge toward and intersect at the central axis 324. Tie down structures 333 are provided at each of the exit/entrance locations for allowing tubing protecting the optical fibers to be tied down (e.g., with cable ties) to the tray.

Figure 20:
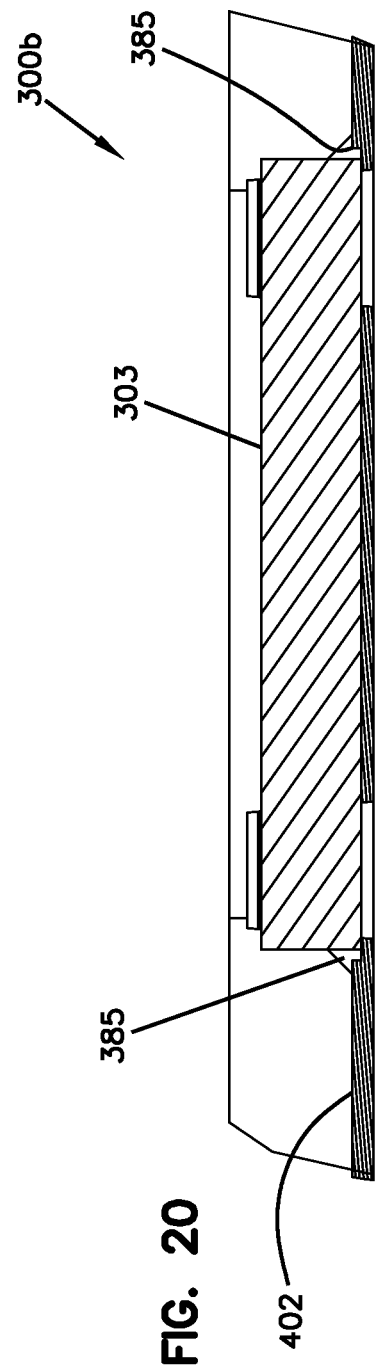
FIG. 20 is a cross-sectional view taken along section line 20-20 of FIG. 17.

Referring to FIGS. 9-12, component mounting locations 350a, 350b are positioned at a central region of the tray 300a and excess fiber storage locations 352 are positioned adjacent the ends of the tray 300a. The excess fiber storage locations 352 are adapted for storing optical fiber 354 in a looped/coiled configuration. The locations 352 are defined in part by inner surfaces of the perimeter wall arrangement 316 and in part by curved cable management walls 353 positioned within the fiber management space 318. The coils can be positioned inside or outside the walls 353 based on user preference. FIGS. 9-12 show various optical fiber routing schemes/paths in which optical fibers are routed from one of the fiber entrance/exit locations 326, 328 through one of the component mounting locations 350a, 350b to one of the fiber entrance/exit locations 330, 332. For ease of depiction, splits are not shown at the wavelength splitting components 304. However, it will be appreciated that multiple output fibers can be provided from each component 304 for each input fiber. All of the depicted routing schemes involve routing the fibers 354 around the inside of the perimeter of the tray 300a. Only FIG. 20 shows excess fiber being coiled at the locations 352. However, it will be appreciated that fiber can be similarly coiled in any of the routing schemes to accommodate excess fiber length. The angling of the fiber entrance/exit locations 330, 332 along orientations P3 and P4 facilitates routing fibers to structures located on opposite sides of the central axis 324 from the respective locations 330, 332 without violating minimum bend radius requirements of the optical fibers The component mounting locations 350a, 350b have a compact configuration adapted for securely attaching optical components to the tray 300a. The component mounting location 350a is adapted for mounting wavelength splitting components 304 to the tray 300a and the component mounting location 350b is adapted for mounting splice sleeves 302 to the tray 300a. The retention structures provided at the locations 350a, 350b are the same, except that the components provided at location 350a are larger than those provided at location 350b.

The retention structures provided at the component mounting locations 350a, 350b define a plurality of elongated pockets 392 (i.e., cavities, receptacles, component receiving locations, receptacles) having lengths aligned substantially perpendicular relative to the central axis 324. The pockets 392 of each location 350a, 350b are arranged in a row of pockets with the lengths of the pockets being substantially parallel to one another. Each of the pockets 392 is defined between two resilient retention members 394 that are substantially parallel to one another and that extend at least a majority of the length of the pocket 392. The resilient retention members 394 have cantilevered configurations with base ends 396 integrally formed (e.g., molded as one seamless piece) with the base 314. The resilient retention members have elastic/spring-like characteristics when bent about their base ends 396 in an orientation transverse to their lengths (e.g., orientation 395). The retention members 394 include concave sides 397 that face at least partially toward the base 314 (e.g., downwardly) and that overhang the pockets 392. The retention members 394 also include convex sides 398 that face away from the base 314 (e.g., upwardly). The concave sides 397 at least partially oppose the convex sides 398 of adjacent retention members 394 such that the sides 397, 398 cooperate to define lateral boundaries of the pockets 392. Through-slots 399 are defined through the base 314 at locations directly beneath the overhanging portions of the concave sides 397 of the retention members 394. The base 314 defines pocket beds 400 between the slots 399 and the convex sides 398 of the retention members 394. The pocket beds 400 include component support surfaces that are recessed relative to a main level 402 of the base 314. End shoulders 403 are defined at the interface between the component support surface and the main level 402.

To load an optical component into one of the component mounting locations 350a, 350b, the component is pressed between the concave side 397 and the convex side 398 of two adjacent retention members 394. As the component is inserted between the sides 397, 398, the retention members 394 elastically flex/deflect apart providing clearance for the component to enter the pocket. After the component passes a point of maximum deflection of the retention members 394, the component is forced toward the pocket bed 400 by the retention members 394 as the retention members 394 are elastically biased toward a retaining configuration (see FIG.

Figure 18:
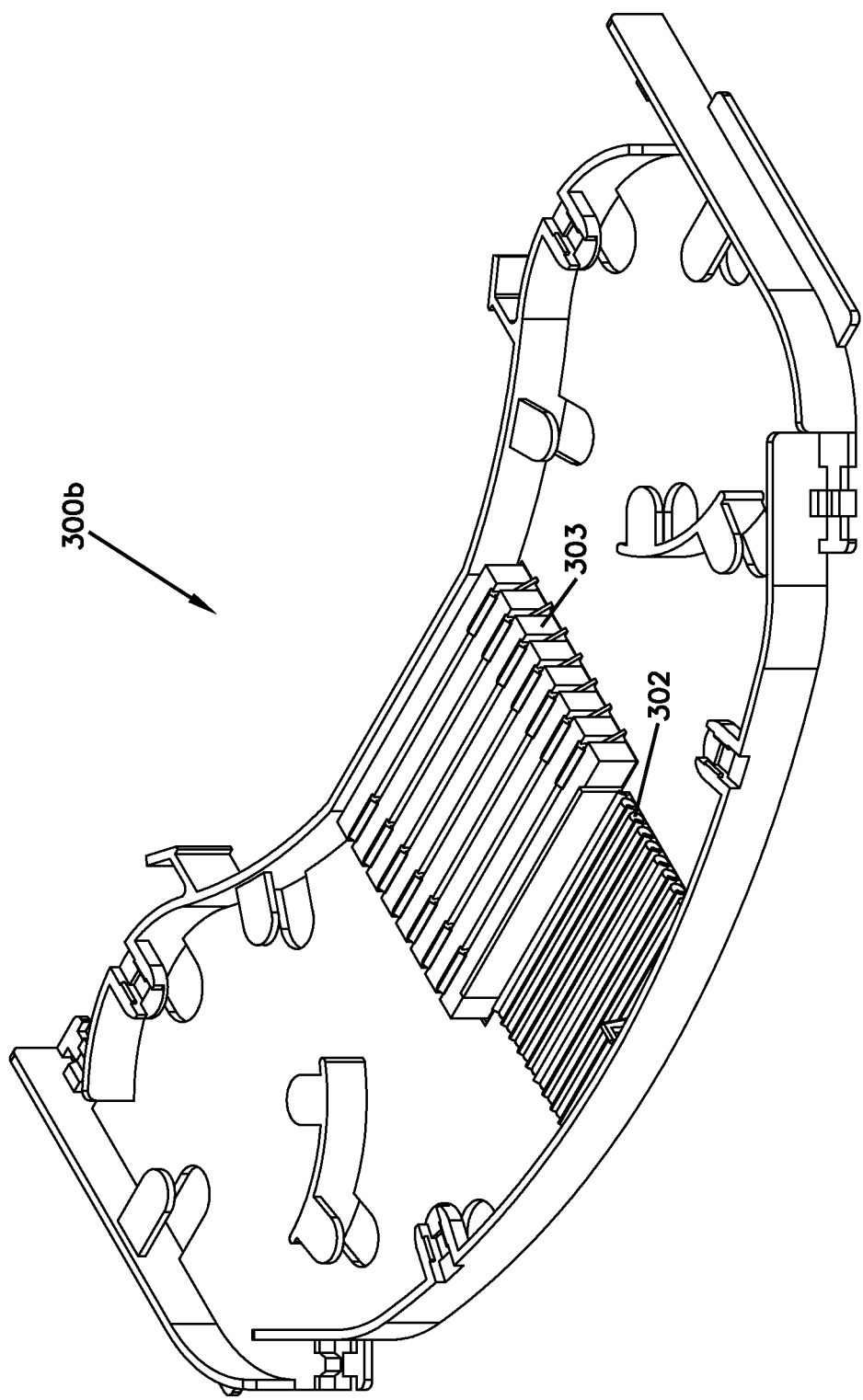
FIG. 18 is a perspective view of the component tray of FIG. 13 with power splitting components and splicing components secured thereto.
Figure 19:
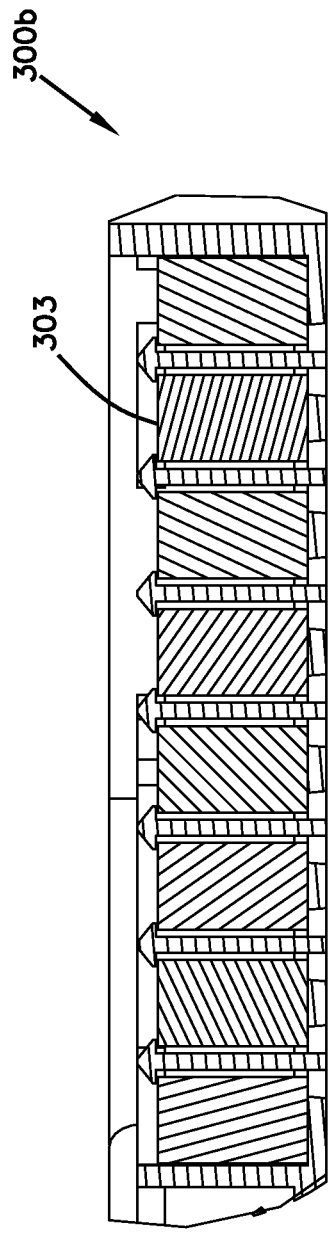
FIG. 19 is a cross-sectional view taken along section line 19-19 of FIG. 17.

17) where the component is captured within the pocket. In certain embodiments, the retention position is a neutral position where the retention members 394 are not deflected. In other embodiments, the retention members 394 can be deflected when in the retention position to apply an elastic retention force to the component. When the component is seated in the pocket, the shoulders 403 limit axial movement of the component within the pocket (see FIG. 18).

FIGS. 14-20 show another tray 300b in accordance with the principles of the present disclosure. The tray 300b includes a component mounting location 350c adapted for securing rectangular components such as optical power splitters 303 to the tray 300b.

Figure 15:
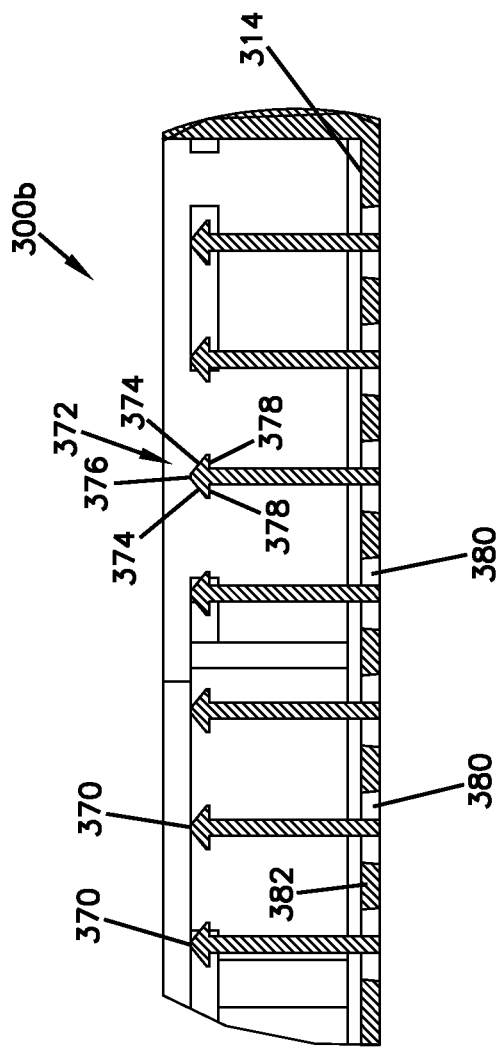
FIG. 15 is a cross-sectional view taken along section line 15-15 of FIG. 13.
Figure 16:
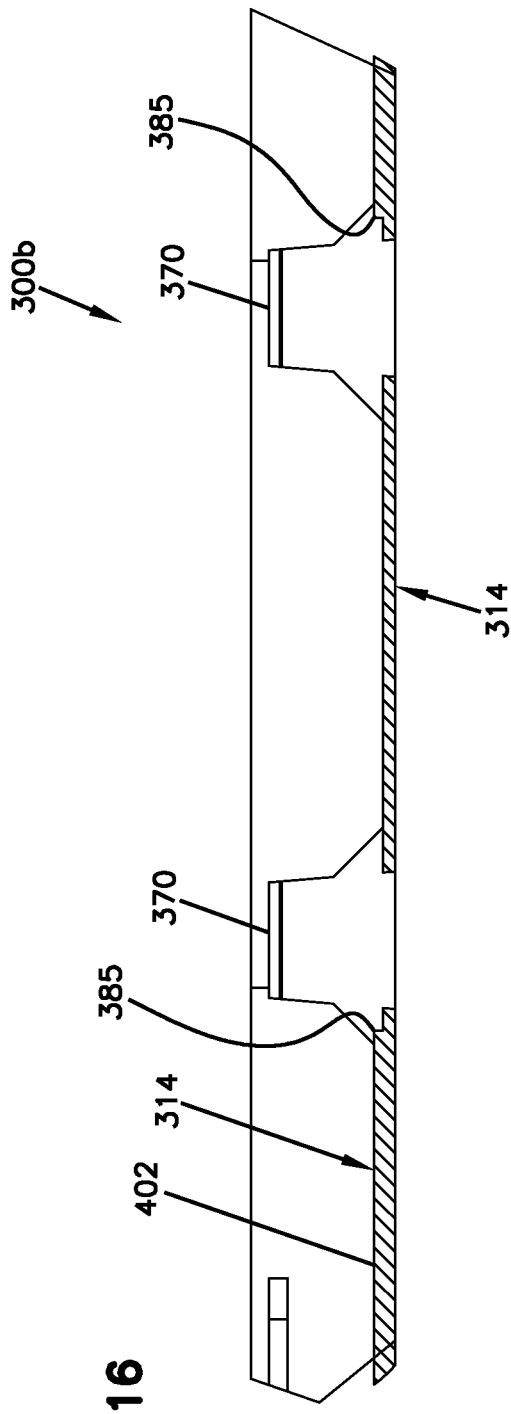
FIG. 16 is a cross-sectional view taken along section line 16-16 of FIG. 13.
Figure 17:
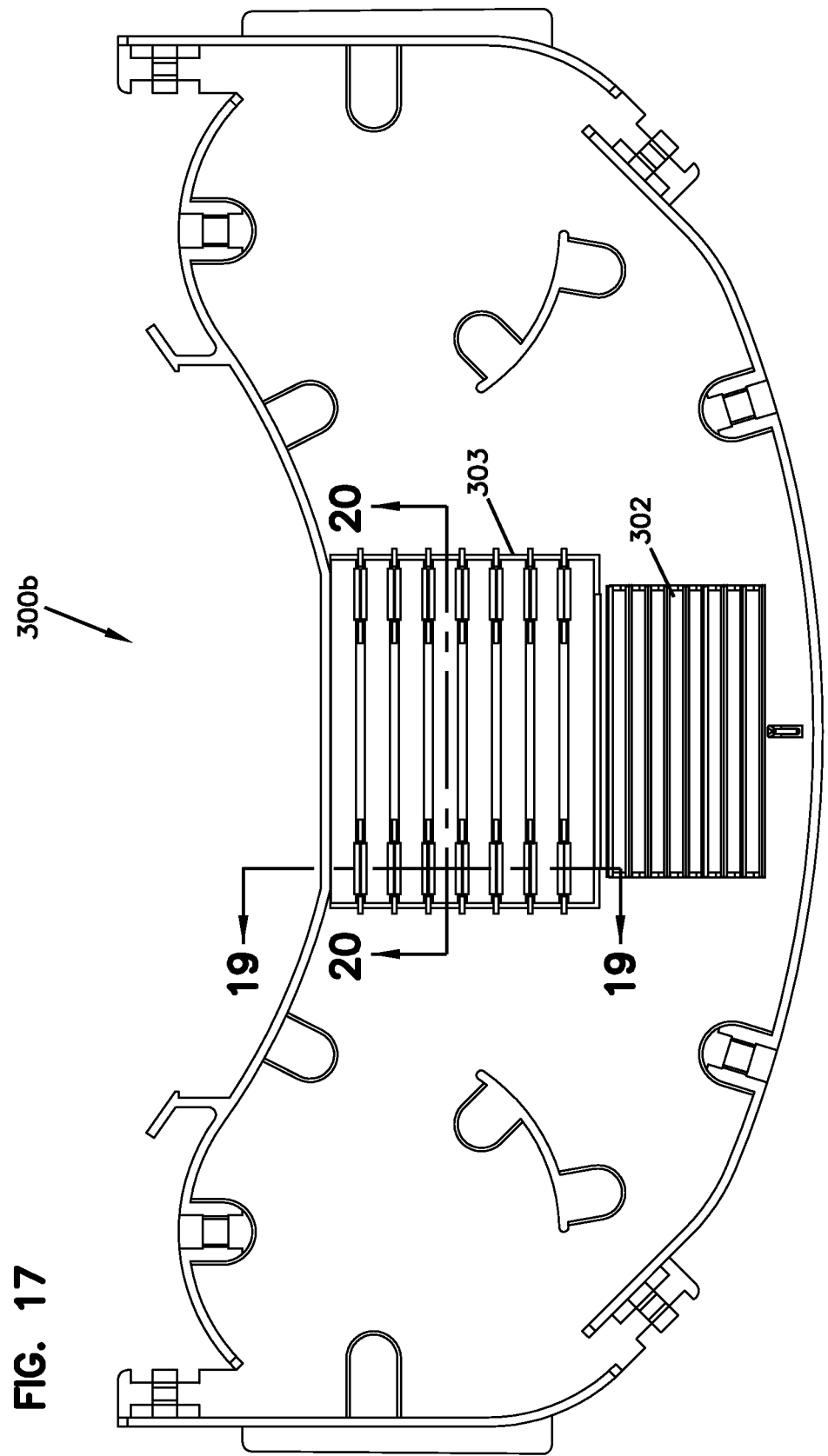
FIG. 17 is a plan view of the component tray of FIG. 13 with power splitting components and splicing components secured thereto.

The retention structures provided at the component mounting location 350c define a plurality of elongated pockets having lengths aligned substantially perpendicular relative to the central axis 324. The pockets are arranged in a row of pockets with the lengths of the pockets being substantially parallel to one another. Each of the pockets is defined between two pairs of resilient retention members 370. The resilient retention members 370 have cantilevered configurations with base ends integrally formed (e.g., molded as one seamless piece) with the base 314. The resilient retention members have elastic/spring-like characteristics when bent about their base ends in an orientation transverse to their lengths. As shown at FIG. 15, the retention members 370 include retention heads 372 each having two cam surfaces 374 that meet at an apex 376. The cam surfaces 374 face upwardly and outwardly and converge as they extend upwardly. Each retention head also includes a retention surface 378 positioned beneath each cam surface 374. The retention surfaces 378 face toward the base 314 (e.g., downwardly) and overhang pockets separated by the main cantilever body of each retention member 370. Through-slots 380 are defined through the base 314 at locations directly beneath the retention surfaces 378. The base 314 defines pocket beds 382 between the slots 380. The pocket beds 382 include component support surfaces (see FIG. 16) that are recessed relative to the main level 402 of the base 314. End shoulders 385 are defined at the interface between the component support surface and the main level 364.

To load an optical component into the component mounting locations 350c, the component is pressed between two of the retention members 370. As the component is pushed downwardly, the component engages the cam surfaces 374 positioned at opposite sides of the pocket causing the retention members 370 to deflect apart providing clearance for the component to enter the pocket. After the component passes a point of maximum deflection of the retention members 370, the component seats on the pocket bed 382 and the retention members 370 elastically move back toward a retaining configuration (see FIG. 19) where the component is captured within the pocket beneath the retention surfaces 378. When the component is seated in the pocket, the shoulders 385 limit axial movement of the component within the pocket (see FIG. 20).

While various integral component retention structures are disclosed, it will be appreciated that in other embodiments non-integral retention structures can be used as well.

As used herein, the phrase "generally parallel" means parallel or almost parallel. Also, the phrase "generally perpendicular" means perpendicular or almost perpendicular.

From the foregoing detailed description, it will be evident that modifications and variations can be made in the devices of the disclosure without departing from the spirit or scope of the invention.

The invention claimed is:

1. A structure for holding an optical component on a fiber management tray, the structure comprising:
a base having a first and second ends and a central axis therebetween;
a plurality of substantially parallel retaining members that cooperate to define elongated pockets for receiving optical components, the elongated pockets being defined between the retaining members, the retaining members having lengths that extend along lengths of the pockets generally perpendicularly to the central axis from a first location between the central axis and the first end, across the central axis, and to a second location between the central axis and the second end such that the retaining members are generally symmetric about the central axis, the retaining members having cantilevered configurations with fixed base ends, the retaining members having heights that project upwardly from the base ends to free ends, the retaining members being configured to flex to allow optical components to be inserted into the pockets, each of the retaining members including a concave side that faces downwardly and a convex side that faces upwardly, each of the pockets having a first side defined by the concave side of one retaining member and a second side defined by the convex side of an adjacent retaining member;
wherein the plurality of retaining members are arranged in first and second groups of retaining members, the first group of the retaining members configured to receive optical components having a first diameter, and the second group of the retaining members configured to receive optical components having a second diameter that is larger than the first diameter.

2. The structure of claim 1, wherein base ends of the retaining members are integrally formed as one seamless piece with the base.

3. The structure of claim 2, wherein the pocket beds are recessed relative to a main surface of the base.

4. The structure of claim 1, wherein the retaining members of the first group each define a first length, and the retaining members of the second group each define a second length that is shorter than the first length.

5. A structure for holding an optical component on a fiber management tray, the structure comprising:
a first group of retaining members including a plurality of substantially parallel retaining members that cooperate to define elongated pockets for receiving optical components, the elongated pockets being defined between the retaining members, the retaining members having cantilevered configurations with fixed base ends, the retaining members having heights that project upwardly from the base ends to free ends, the retaining members being configured to flex to allow optical components to be inserted into the pockets, the retaining members including heads at their free ends, the heads including upwardly facing first and second cam surfaces that converge as the first and second cam surfaces extend upwardly toward apexes of the heads, each of the heads including two downwardly facing retention surfaces that extend over separate ones of the elongated pockets; and
a second group of retaining members including a plurality of substantially parallel cantilevered retaining members that cooperate to define elongated pockets for receiving optical components, the elongated pockets being defined between the cantilevered retaining members, the cantilevered retaining members having lengths that extend along lengths of the pockets, the cantilevered retaining members having cantilevered configurations with fixed base ends, the cantilevered retaining members having heights that project upwardly from the base ends to free ends, the cantilevered retaining members being configured to flex to allow optical components to be inserted into the pockets, each of the cantilevered retaining members including a concave side that faces downwardly and a convex side that faces upwardly, each of the pockets having a first side defined by the concave side of one cantilevered retaining member and a second side defined by the convex side of an adjacent cantilevered retaining member.

6. The structure of claim 5, further comprising a base including a planar surface, wherein the downwardly facing retention surfaces are oriented generally parallel to the planar surface.

7. The structure of claim 5, further comprising a base including a planar surface, wherein retaining members have opposing parallel side surfaces extending between the base ends and the free ends, the side surfaces oriented generally perpendicular to the planar surface such that the pockets are configured to receive rectangular components.

* * * * *